Patented June 3, 1930

1,760,990

UNITED STATES PATENT OFFICE

HERBERT H. MEYERS, OF PITTSBURGH, PENNSYLVANIA, ASSIGNOR TO ARMOUR FERTILIZER WORKS, OF CHICAGO, ILLINOIS, A CORPORATION OF NEW JERSEY

MANUFACTURE OF CONCENTRATED FERTILIZER MATERIAL

No Drawing.  Application filed April 13, 1928. Serial No. 269,874.

The usual procedure followed in manufacturing ammonium phosphate has been to add ammonia to liquid phosphoric acid, evaporating and drying the product to a solid, and, similarly or comparably, the customary method employed to make potassium phosphates has been the addition of alkaline potash compounds to liquid phosphoric acid, with the additional steps noted above.

According to the principles of the present invention, ammonium phosphates, or mixed ammonium and alkali metal phosphates, are prepared by an improved and novel process which offers certain and distinct advantages in the cost of manufacture and in the flexibility of operation.

Available calcined phosphates, made by calcining phosphate-rock with alkali metal salts, have been known for some time, and a suitable and convenient method of preparing calcined phosphates has been presented in United States Letters Patent No. 1,578,339, for production of available phosphate, granted to myself March 30, 1926.

The process of such patent may be succinctly or concisely stated as consisting in sintering a mixture comprising ground phosphate-rock containing adequate silica or with added silica if required, an alkali metal salt, and carbonaceous material, thereby effecting a partial conversion of the phosphate, crushing such sintered mixture into porous lumps, and calcining such lumps at a sufficient temperature and for a period of time to complete the conversion of the phosphate into available phosphate.

If a calcined phosphate high in ammonium citrate availability, such as results from practicing the process presented in the specified patent, is treated with a solution containing ammonia and carbon dioxide, or their equivalent ammonium carbonate, the calcined phosphate is decomposed, resulting in the production of ammonium and alkali phosphates and calcium carbonate, the latter being precipitated as a solid, the phosphates remaining in solution.

Such solution is filtered off and may be treated in any one of a number of ways to yield ammonium phosphate, or mixed ammonium and alkali phosphates, particularly mixed ammonium and potash phosphates.

In this way, a calcined phosphate analyzing ninety per cent. or better of its $P_2O_5$ available by the citrate method will show between 55 eighty per cent. and ninety per cent. of its phosphate soluble in the above-specified solution under the proper conditions.

One procedure consists in grinding the calcined phosphate material to about one hundred mesh, adding to one part thereof by weight about three parts of ammonium carbonate and approximately six parts of water. The mixture is then stirred until the decomposition or reaction is complete, whereupon the filtrate is evaporated (the vapors being condensed to recover the excess ammonium carbonate) until crystallization starts, upon the occurrence of which the whole mass is dried down at a temperature sufficiently low to prevent decomposition of ammonium phosphate and to result in a crystalline solid product containing about eight per cent. to ten per cent. ammonia and approximately fifty per cent. to sixty per cent. $P_2O_5$.

Another course of operation comprises placing the ground, calcined phosphate material in an autoclave, together with an excess of ammonia water, or commercial ammonia liquor, and, while agitating the mixture, carbon dioxide, as the pure gas, or in the form of flue gases, is blown into the mixture under slight pressure. For the best results enough carbon dioxide is introduced into the autoclave to produce normal ammonium carbonate, $(NH_4)_2CO_3$, but an excess of carbon dioxide over this may be used. Owing to the neutralization taking place, the mixture heats up somewhat, and it is not advisable to allow such temperature to rise very high, and agitation is continued until the mixture is cool, at least below fifty degrees to sixty degrees centigrade. Agitation for a period of about six to eight hours gives satisfactory results, and, at the end of such duration, the solution is filtered off and evaporated, with recovery of vapors, to about 1.4 or higher specific gravity. Then the solution is thoroughly saturated with ammonia gas to increase the ammonia content and to render the drying easier, whereupon the mass crystallizes and is then dried completely, recovering any ammonia vapor which is driven off. In this manner a crystalline product is made analyzing from about eighteen per cent. to twenty per cent. ammonia and from about forty-eight per cent. to fifty per cent. $P_2O_5$.

It is to be understood, of course, that the solution resulting from the employment of the ammonium carbonate can be treated in the same way as specified in the immediately preceding paragraph.

If a calcined product is employed which has been prepared with potash salts, a final product salt will be obtained containing $NH_3$—$P_2O_5$ and $K_2O$. For example, if calcines are used which were made by the employment of twenty-five to thirty parts $K_2SO_4$ to one hundred parts of phosphate-rock, final products can be secured analyzing 13% ($NH_3$), 45% ($P_2O_5$), 13% ($K_2O$) to 12% ($NH_3$), 45% ($P_2O_5$), 15% ($K_2O$), and by varying the potash content different compositions may be produced.

Those skilled in this art will readily understand that this invention, as defined by the appended claims, is not limited or restricted to the precise and exact details of the process presented, and that many changes may be incorporated in the modes of procedure without departing from the vital and essential characteristics of the invention and without the loss or surrender of any of its substantial and material benefits and gains.

I claim:

1. The process of making a concentrated fertilizer material, consisting in treating a calcined phosphatic material containing available phosphate, as determined by the standard ammonium citrate method, with ammonia, water and carbon dioxide to yield ammonium phosphate and calcium carbonate.

2. The process of making a concentrated fertilizer material, consisting in treating a calcined phosphatic material containing an alkali metal and in which the phosphate is highly available, as determined by the standard ammonium citrate method, with ammonia, water and carbon dioxide to yield ammonium and alkali metal phosphates and calcium carbonate.

3. The process of making a concentrated fertilizer material, consisting in treating a calcined phosphatic material containing an alkali metal and in which the phosphate is highly available, as determined by the standard ammonium citrate method, with ammonia, water and carbon dioxide to yield ammonium and alkali metal phosphates and calcium carbonate, and separating such phosphates from said calcium carbonate.

4. The process of making a concentrated fertilizer material, consisting in treating a calcined phosphatic material containing an alkali metal and in which the phosphate is highly available, as determined by the standard ammonium citrate method, with ammonia, water and carbon dioxide to yield ammonium and alkali metal phosphates and calcium carbonate, removing the calcium carbonate from the solution and evaporating the solution to crystallize the phosphates out.

5. The process of making a concentrated fertilizer material, consisting in treating a calcined phosphatic material containing an alkali metal and in which the phosphate is highly available, as determined by the standard ammonium citrate method, with ammonia, water and carbon dioxide to yield ammonium and alkali metal phosphates and calcium carbonate, removing the calcium carbonate from the solution, substantially saturating the solution with ammonia gas causing some crystallization, and drying to remove the excess moisture and to produce a crystalline product.

6. The process of making a concentrated fertilizer material, consisting in treating a calcined phosphatic material containing an alkali metal and in which the phosphate is highly available, as determined by the standard ammonium citrate method in an autoclave with an excess of ammonia and water and while agitating the mixture blowing through it carbon dioxide under slight pressure and in amount at least sufficient to produce normal ammonium carbonate, agitating such mixture and preventing an excessive rise in temperature, filtering off the solution, then evaporating such solution to about 1.4 specific gravity, then saturating the solution with ammonia gas, and then drying it to produce a crystalline product of ammonium and alkali metal phosphates.

In witness whereof I have hereunto set my hand.

HERBERT H. MEYERS.